United States Patent
Rajamanickam et al.

(10) Patent No.: US 12,395,413 B1
(45) Date of Patent: Aug. 19, 2025

(54) CONVEYING OPERATOR INTENT TO REMOTE AGENTS IN AN ADMINISTRATIVE-CONSTRAINED CROSS-DOMAIN MULTI-CONTROLLER FSO NETWORK

(71) Applicant: Cisco Technology, Inc., San Jose, CA (US)

(72) Inventors: Jaganbabu Rajamanickam, Kanata (CA); Nagendra Kumar Nainar, Morrisville, NC (US); Madhan Sankaranarayanan, Nadu (IN); Carlos M. Pignataro, Cary, NC (US); David John Zacks, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/444,388

(22) Filed: Feb. 16, 2024

(51) Int. Cl.
*G06F 15/173* (2006.01)
*H04L 9/40* (2022.01)
*H04L 43/08* (2022.01)
*H04L 45/02* (2022.01)

(52) U.S. Cl.
CPC .............. *H04L 43/08* (2013.01); *H04L 45/04* (2013.01); *H04L 63/08* (2013.01)

(58) Field of Classification Search
None
See application file for complete search history.

(56) References Cited

U.S. PATENT DOCUMENTS

| | | | |
|---|---|---|---|
| 9,787,559 B1* | 10/2017 | Schroeder | H04L 43/106 |
| 2012/0269053 A1 | 10/2012 | Yu et al. | |
| 2017/0302474 A1 | 10/2017 | Li et al. | |
| 2018/0132117 A1 | 5/2018 | Senarath et al. | |
| 2019/0173736 A1 | 6/2019 | Ponnuswamy et al. | |
| 2020/0162337 A1* | 5/2020 | Jain | H04L 41/40 |
| 2020/0296026 A1* | 9/2020 | Michael | H04L 45/12 |
| 2023/0062502 A1 | 3/2023 | Nainar et al. | |
| 2023/0136635 A1* | 5/2023 | Mishra | H04L 43/08 370/254 |

(Continued)

OTHER PUBLICATIONS

Ye M., et al., "A New Intelligent Cross-Domain Routing Method in SDN Based on a Proposed Multiagent Reinforcement Learning Algorithm", Arxiv, Mar. 14, 2023, 19 Pages.

*Primary Examiner* — Phuoc H Nguyen
(74) *Attorney, Agent, or Firm* — Polsinelli P.C.

(57) ABSTRACT

A method is described that involves a method for application performance in a cross-domain network using multi-controller coordination. The method includes receiving a request at a first controller from an application within an enterprise network, wherein the request seeks to monitor a network path. The first controller identifies one or more additional controllers within the enterprise network capable of monitoring the network path. These additional controllers include a first one within the same domain as the first controller (first domain) and a second one within a different domain (second domain). A token, encompassing authentication details and monitoring requirements linked to the request, is sent to the second additional controller from the first domain. Subsequently, direct communication is established with a resource of the second controller, allowing monitoring of the request and its associated operation.

20 Claims, 9 Drawing Sheets

(56) References Cited

U.S. PATENT DOCUMENTS

| | | | | |
|---|---|---|---|---|
| 2023/0318935 A1* | 10/2023 | Sergeev | ............. | H04L 41/0896 |
| | | | | 709/223 |
| 2023/0344707 A1* | 10/2023 | Sowatskey | ............. | H04L 47/82 |
| 2025/0077380 A1* | 3/2025 | Kanote | ............... | G06F 11/3006 |

* cited by examiner

CONVEYING OPERATOR INTENT TO REMOTE AGENTS IN AN ADMINISTRATIVE-CONSTRAINED CROSS-DOMAIN MULTI-CONTROLLER FSO NETWORK

FIELD OF THE TECHNOLOGY

The present technology relates to the field of network communication technologies addressing configurations for monitoring applications performance in a network. Specifically, the proposed technology relates to methods for monitoring application performance in a cross-domain network using multi-controller coordination.

BACKGROUND

In pursuit of the highest level of service performance and user experience, companies around the world are engaging in digital transformation by enhancing investments in digital technology and information technology (IT) services. By leveraging the global system of interconnected computer networks afforded by the Internet and the World Wide Web, companies are able to provide ever-increasing web services to their clients. The web services may be provided by a web application that uses multiple services and applications to handle a given transaction. The applications may be distributed over several interconnected machines, such as servers, making the topology of the machines that provide the service more difficult to track and monitor.

The process of monitoring applications in a cross-domain network involves coordinating with multiple controllers. When an enterprise network application requests to monitor a network path, a first controller receives the request. The first controller then identifies other capable controllers within the enterprise network that can monitor the same network path, even if they are in different domains. The authentication details and monitoring requirements associated with the request are then sent as a token to the relevant controllers. After that, direct communication is established with the resources of the identified controllers to enable efficient monitoring of the application's performance and associated operations across different domains within the network.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

DETAILED DESCRIPTION

Figure 1:
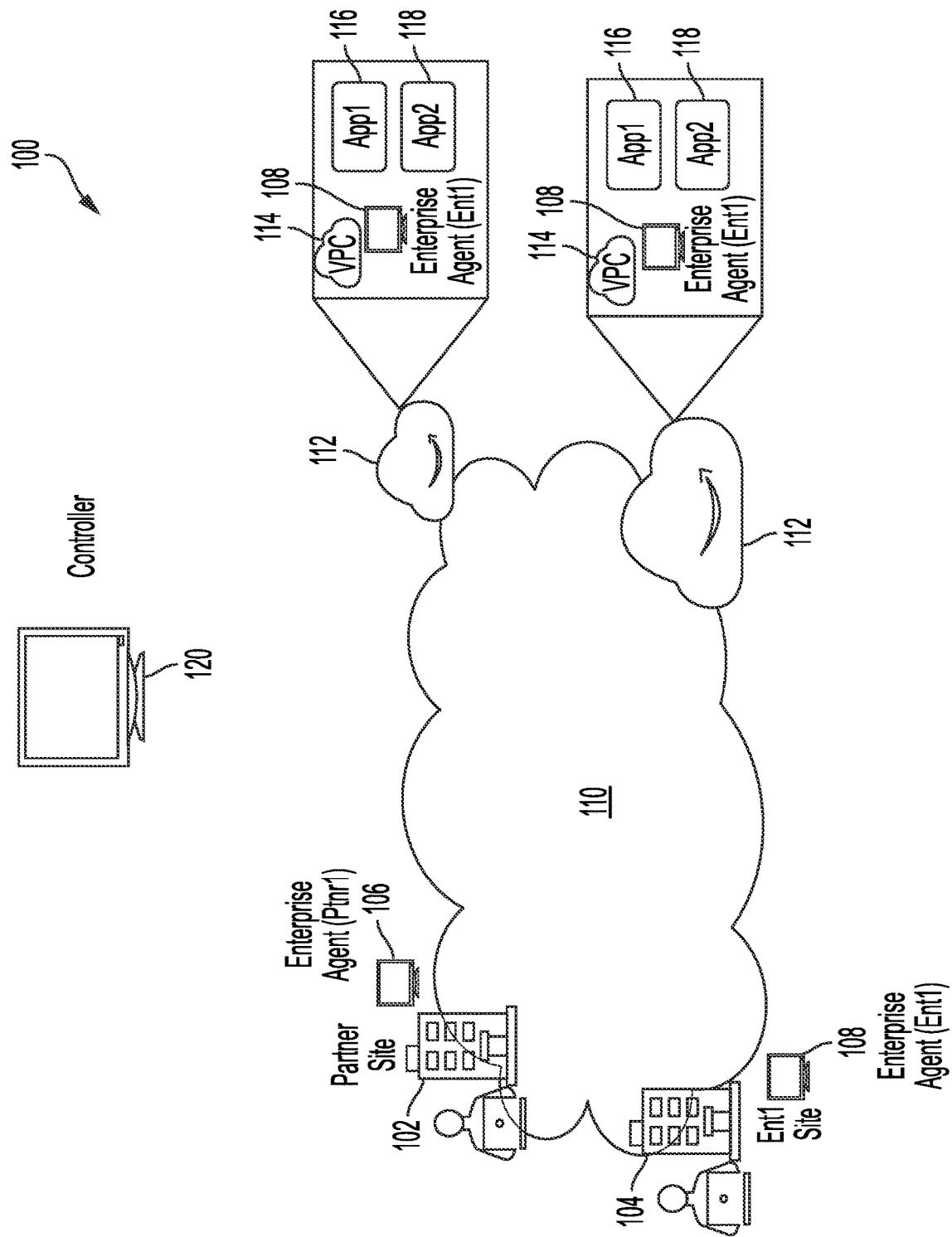
FIG. 1 illustrates an example system where an application is hosted in a cloud environment, in accordance with some examples of the disclosure.

Various examples of the disclosure are discussed in detail below. While specific implementations are discussed, it should be understood that this is done for illustration purposes. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an example in the present disclosure can be references to the same example or any example; and such references mean at least one of the examples.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

OVERVIEW

The present disclosure describes a method for monitoring application performance in a cross-domain network with third-party involvement using multi-controller coordination.

In one aspect, the techniques described herein relate to a method for monitoring application performance in a cross-domain network using multi-controller coordination, the method including: receiving, at a first controller, a request, from an application managed by an enterprise network including requests to monitor a network path; identifying, at the first controller, one or more additional controllers, in the enterprise network, operable to monitor the network path, wherein the one or more additional controllers includes a first additional controller in a first domain that is in a same domain as the first controller, and a second additional controller in a domain that is different from the first domain; sending to the second additional controller, a token from the first domain including authentication details and one or more monitoring requirements associated with the request; and communicating directly with a resource, of the second controller, operable to monitor the request and an associated operation.

In some aspects, the techniques described herein relate to a method, wherein the request includes request information that includes one or more actions to be performed along the network path by the managed application.

In some aspects, the techniques described herein relate to a method, wherein the request information specifies to the second controller a type of action to be performed, a cadence at which the type of action is to be executed, and one or more probes to use during the type of action.

In some aspects, the techniques described herein relate to a method, wherein the second controller is configured to: generate an access key related to the resource of the second controller, the access key configured to authenticate the first controller to execute one or more actions to monitor the network path at the resource, wherein the one or more actions include monitoring one or more network metrics; and determine based on the request one or more resources associated with the second controller to share with the first controller.

In some aspects, the techniques described herein relate to a method, wherein the first controller and the second controller are configured to share the resource to perform network monitoring at network paths associated with each of the first and second controller.

In some aspects, the techniques described herein relate to a method, further including performing, at the second controller, a validation procedure to determine one or more capabilities of the resource to perform one or more requirements in the request from the first controller.

In some aspects, the techniques described herein relate to a method, wherein the operation includes an execution of a set of instructions to probe one or more portions of the network path, wherein the probe is configured to identify a plurality of network metrics related to performance of the application.

In one aspect, the techniques described herein relate to a network device for monitoring application performance in a cross-domain network using multi-controller coordination, including: a transceiver; a processor configured to execute instructions and cause the processor to: receiving, at a first controller, a request, from an application managed by an enterprise network including requests to monitor a network path; identifying, at the first controller, one or more additional controllers, in the enterprise network, operable to monitor the network path, wherein the one or more additional controllers includes a first additional controller in a first domain that is in a same domain as the first controller, and a second additional controller in a domain that is different from the first domain; sending to the second additional controller, a token from the first domain including authentication details and one or more monitoring requirements associated with the request; and communicating directly with a resource, of the second controller, operable to monitor the request and an associated operation.

In one aspect, the techniques described herein relate to a non-transitory computer-readable medium including instructions, the instructions, when executed by a computing system, cause the computing system to: receive, at a first controller, a request, from an application managed by an enterprise network including requests to monitor a network path; identify, at the first controller, one or more additional controllers, in the enterprise network, operable to monitor the network path, wherein the one or more additional controllers includes a first additional controller in a first domain that is in a same domain as the first controller, and a second additional controller in a domain that is different from the first domain; send to the second additional controller, a token from the first domain including authentication details and one or more monitoring requirements associated with the request; and communicate directly with a resource, of the second controller, operable to monitor the request and an associated operation.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IoT) network.

DESCRIPTION OF EXAMPLE EMBODIMENTS

Monitoring application performance in a cross-domain network, particularly within a cloud environment, employs a multi-controller coordination strategy. In a multi-controller coordination strategy, initially, a primary controller receives requests from applications within an enterprise network, expressing the need to monitor specific network paths. In response, the primary controller identifies additional controllers dispersed across the enterprise network, each capable of monitoring the designated network paths. Each of these additional controllers possesses the capability to monitor the designated network paths, contributing to a distributed yet cohesive monitoring infrastructure. Being adaptable becomes particularly significant in cloud environments, characterized by the dispersion of network domains across diverse cloud services and providers.

A feature of the approach involves the secure communication between controllers residing in distinct domains. The primary controller initiates communication by dispatching a token to the relevant controllers in other domains. The token encapsulates authentication details and monitoring requirements, thereby empowering the secondary controllers to directly access and monitor the specified network paths and their associated operations within their respective domains.

Multi-controller coordination is advantageous due to the ability to enhance the flexibility and efficiency of application performance monitoring within cloud-based, cross-domain networks. Leveraging controllers across different domains ensures a comprehensive and holistic view of network performance, an important aspect given the dynamic and distributed nature of cloud environments. The use of multi-controller coordination is especially valuable in cloud scenarios where traditional monitoring approaches may face challenges due to the diverse and dispersed nature of network domains.

The proposed technology improves the traditional monitoring approaches by introducing a new agent type, otherwise acting as a "shared agent," which is capable of being used as a destination agent to execute different test cases in the cloud environment. The shared agent is capable of executing Test-Case requests from an agent outside its administrative domain. When an enterprise controller receives a network path monitoring request, it computes a plurality of capable agents for monitoring. If the agents are within the same domain, no action is needed. In the case of involving a shared agent from a different administrative domain, the respective controller is contacted with local secure token details, test case specifications, and cadence. The responding controller creates test cases, configures the infrastructure for synthetic probes, and reports any violations back to the originating controller. Delete requests result in the relevant agent configuration being cleared. After Test-Case negotiation, the partner controller provides the key to the partner-shared agent, and the enterprise controller relays the key to the enterprise-shared agent. The enterprise-shared agent uses the key to initiate Test-Case execution with endpoints in other enterprise domains, facilitating direct communication between agents without controller involvement. After Test-Case completion, the partner's shared agent sends the Test-Case usage count back to the partner controller for accountability.

In the realm of full-stack observability, different agents and tools provide unique metrics and events that are specific to various operational teams. Metrics that are focused on applications, for example, are relevant to both application and development operations, as well as various network operations. Therefore, providing effective cross-pollination and coordination between operational domains.

FIG. 1 illustrates an example system where an application is hosted in a cloud environment, in accordance with some examples of the disclosure. For instance, an application that is hosted in a cloud environment is accessed by enterprise end-users. However, the application may also restrict access to partners or other enterprises for various business purposes.

In FIG. 1, an enterprise site agent 108 hosts both the first application (App1) 116 and the second application (App2) 118 via a cloud service API 112 at enterprise site 104. In certain instances, the enterprise site agent 108 may acquire access to the partner site enterprise agent 106 situated at the partner site 102. The enterprise site agent 108 is cloud-hosted within the virtual private cloud (VPC) 114 via a cloud service application protocol interface (API) 112 and manages both App1 116 and App2 118. App1 116 and App2 118 are provisioned to exclusively access the enterprise site agent 108 and are not configured to interact with the partner site enterprise agent 106.

In a controller-managed cloud environment, a scenario may arise where controller 120 identifies the need for comprehensive monitoring of the application performance of App1 116 and App2 118 along a specific network path that spans both the enterprise site 104 and the partner site 102. Recognizing this requirement, controller 120 can instruct enterprise site agent 108 to establish secure access to the partner site enterprise agent 106. Establishing the secure access ensures that the enterprise site agent 108 can effectively collaborate with the partner site enterprise agent 106 to gather pertinent metrics and events, contributing to a holistic view of the entire network path. By enabling controlled communication between the partner site enterprise agent 106 and the enterprise site agent 108, controller 120 enhances cross-domain visibility and coordination, facilitating more informed decision-making and optimized performance management across the interconnected sites.

Controller 120 can communicate with a cloud service API 112 that interacts with App1 116 and App2 118. The cloud service API 112 can provide valuable data and events from App1 116 and App2 118 to assist the controller in monitoring the network path. By collaborating among the enterprise site agent 108, the partner site enterprise agent 106, and the cloud service API 112, the controller gains a comprehensive understanding of the network path to enhance cross-domain visibility and coordination. Controller 120 has the capability to communicate with a cloud service API 112, which enables seamless data sharing and collaboration between App1 116, App2 118, enterprise site agent 108, and the cloud environment. The cloud service API 112 provides valuable data and events from App1 116 and App2 118, which can assist the controller in monitoring the network path effectively.

App1 116 and App2 118 can provide valuable data and events that include performance metrics such as response times, latency, and throughput. These metrics help to understand the applications' efficiency and resource utilization, including CPU, memory, and storage. The cloud service API 112 also communicates network dynamics events, such as data transmission success, errors, and retransmissions, which help to assess the network's reliability and integrity. Additionally, the API monitors APP1 116 and App2 118 to identify context-specific information relevant to the functionalities and operations of APP1 and App2 118, and transmits the specific information to the controller.

In some examples, controller 120 can utilize enterprise site agent 108 as a shared agent in the cloud environment 110, which plays a pivotal role in streamlining communication between the enterprise site agent 108 and the partner site enterprise agent 106. The shared agent can act as a facilitator, whereby the shared agent ensures seamless collaboration between the partner site 102 and the enterprise site 104 by providing a standardized communication interface and secure data exchange. By employing enterprise site agent 108 as the shared agent, enterprise site agent 108 gains the capability to efficiently gather pertinent metrics and events not only from its hosted applications, App1 116 and App2 118 but also from the partner site's corresponding enterprise site agent 108. Thus, a collaborative monitoring approach can be used to enhance the performance and observability of a cloud environment. The collaborative monitoring approach can span multiple segments of the network path including the exit points between the partner site enterprise agent 106, the enterprise site agent 108, App1 116, and App2 118. By utilizing shared agents, the controller's 120 orchestrated use can improve the overall operational efficiency of the interconnected cloud environment 110.

Figure 2:
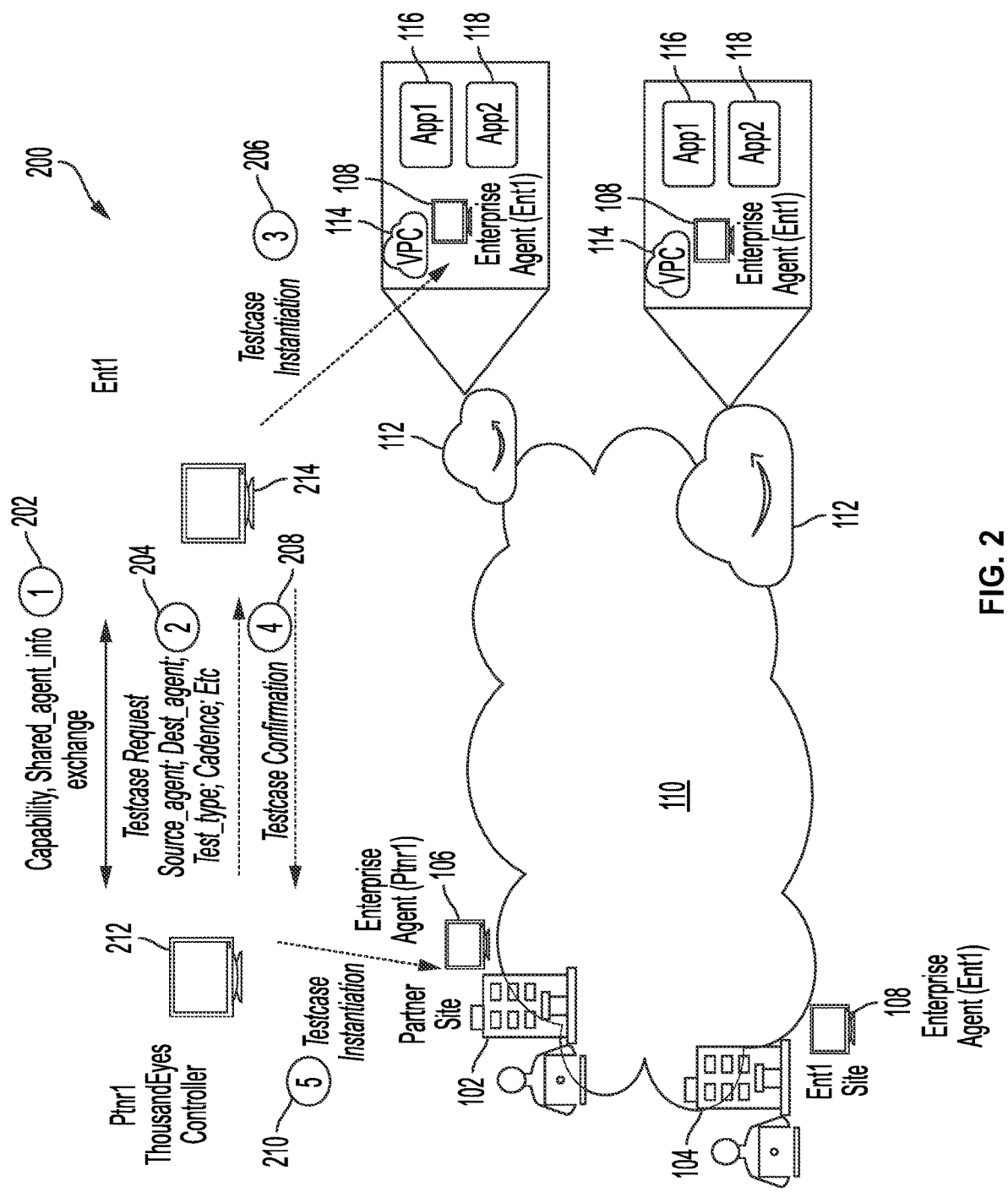
FIG. 2 illustrates an example system where multiple applications sharing a shared agent are hosted in a cloud environment, in accordance with some examples of the disclosure.

FIG. 2 illustrates an example system where multiple applications sharing a shared agent are hosted in a cloud environment, in accordance with some examples of the disclosure. The proposed technology introduces dynamic multi-controller coordination, facilitating the secure exchange of limited agent details between a partner site enterprise agent 106 and the enterprise site agent 108.

FIG. 2 depicts a system 200 that includes a shared agent serves as a destination agent capable of executing diverse test cases within a cloud environment. The shared agent proposed can act as a hybrid between a cloud and enterprise agent. The shared agent is hosted and managed by a specific enterprise but is made available for utilization by the partner site enterprise agent 106 or the enterprise site agent 108. The presence of such a shared agent can be communicated through a controller 120 or protocols like the border gateway protocol (BGP). The presence can be broadcast via an advertisement that will encompass a secure token assigned by the controller for all locally managed shared agents. In some examples, each agent can possess its own unique token. While in an alternative configuration, the token may be assigned to each partner site enterprise agent 106 expressing an interest in utilizing the shared agent.

As shown in FIG. 2, a shared agent negotiation can take place. To initiate the shared agent negotiation 202, the enterprise controller 214 receives a network path monitoring request from a partner controller 212 in the cloud environment 110. The enterprise controller 214 can determine one or more capable agents to assist in the monitoring of a plurality of network portions in the cloud environment 110. Once a shared agent has been identified and selected, the enterprise controller 214 can communicate the agent's capabilities and information to the partner controller 212. The capable agent effectively becomes the shared agent that is to be shared between the enterprise controller 214 and the partner controller 212 for monitoring application performance on one or more network paths in the cloud environment 110. If it is determined by partner controller 212 that the shared agent is in the same domain, no further action is taken.

Upon identification that the shared agent belongs to a distinct domain, the partner controller 212 initiates a request 204 to commence a test case using the shared agent. Request 204 includes a specified test case to run and is directed to the enterprise controller 214 subsequent to obtaining the shared agent information. The test case request can further include local secure token details, test case specifications, including the source agent and destination agent details, and cadence.

Enterprise controller 214 can trigger the creation of a test case instance 206 with the enterprise site agent 108. The test case instance 206 can configure the infrastructure for synthetic probes to monitor portions of one or more network paths and reports any violations of the predetermined performance indicators of App1 116 and App2 118 back to the enterprise controller 214.

In some examples, the creation of the test case instance 206 can trigger one or more delete requests that prompt the clearing of previously established agent configurations. The cleared previous agent configurations are subsequently replaced with the information of the shared agent.

When the test case request 204 is received by enterprise controller 214, enterprise controller 214 can respond 208 with a confirmation that the test case instance 206 has been created. Additionally, enterprise controller 214 can confirm that monitoring is currently taking place and communication has been established with the shared agent.

In response to the confirmation in response 208, partner controller 212 can initiate a test case instance 210 with the partner site enterprise agent 106 at the partner site 102. During the initiation of the test case instance 210, partner controller 212 can provide a security key to the partner site enterprise agent 106, and enterprise controller 214 can relay the security key to the enterprise site agent 108, which is effectively being shared with the partner controller 212 and the partner site enterprise agent 106.

The shared agent uses the key to initiate a test case instance 210 with endpoints in other enterprise domains, facilitating direct communication between enterprise site agent 108 and partner site enterprise agent 106 without involvement from the partner controller 212 or the enterprise controller 214. Once the test case is complete, the partner site enterprise agent 106 sends the test-case usage count back to the partner controller 212 for accountability.

Figure 3:
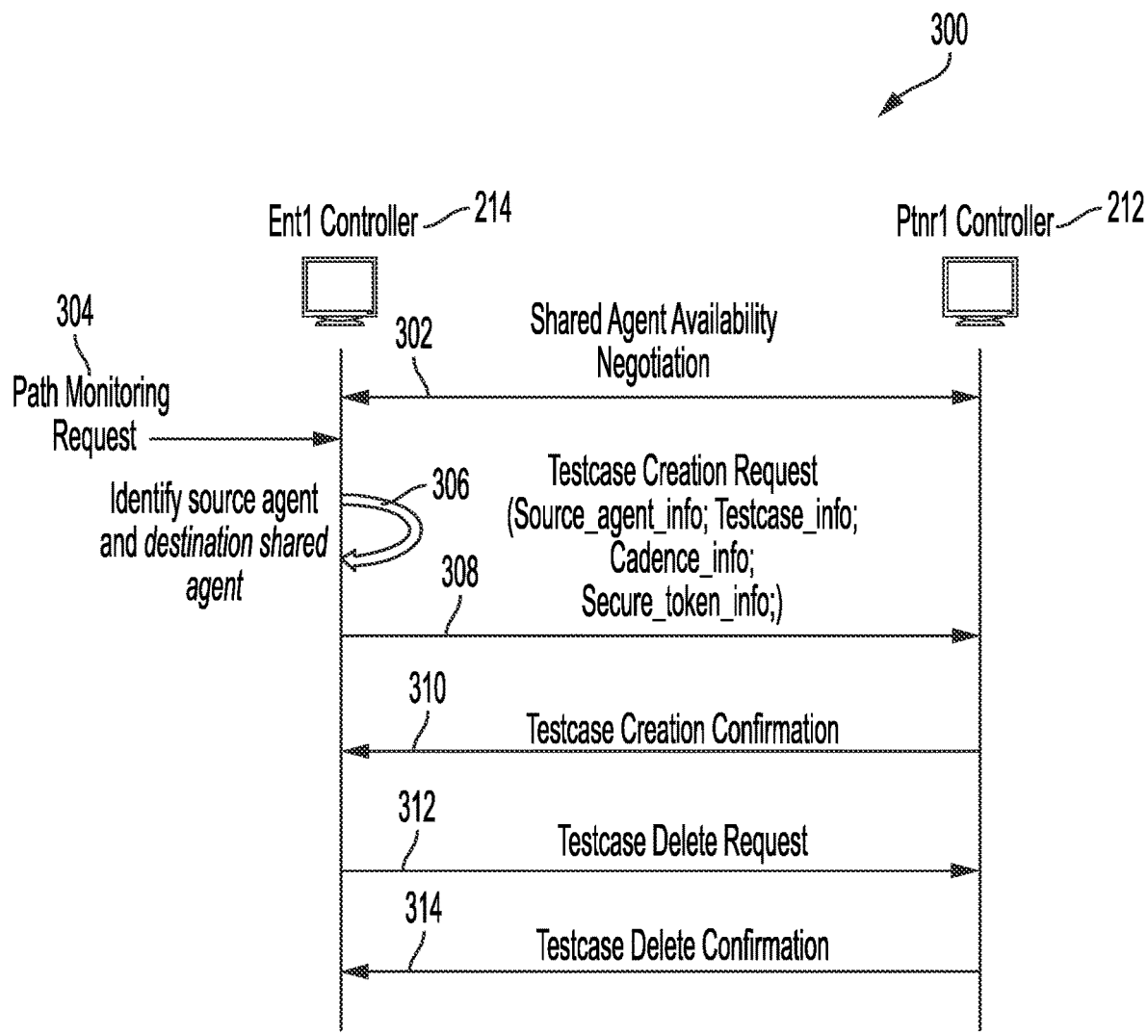
FIG. 3 illustrates an example process for determining shared agent availability between multiple controllers in accordance with some examples of the disclosure.

FIG. 3 illustrates an example process 300 for determining shared agent availability between multiple controllers in accordance with some examples of the disclosure. The following disclosure, outlined in steps 302-312, illustrates communication between the enterprise controller 214 and the partner controller 212 when performing the shared agent selection.

According to example process 300, partner controller 212 and enterprise controller 214 can initiate communications 302 to determine and negotiate the availability of a shared agent.

The originating controller upon receiving a request for path monitoring 304 from any of the internal applications/users/admin, can check the database to identify the agents to be used for path monitoring. If the agents are linked with enterprise controller 214 or belong to the same domain as enterprise controller 214, then no further action is required, and the standard method will be employed. As a result, a shared agent located in a different domain will not be identified.

If the standard method is employed, the enterprise controller 214 can initiate a process to identify a source agent and a destination shared agent 306. During the identification, the 214 can further perform a determination of whether the agents identified belong to the same domain as the enterprise controller 214. Accordingly, if the agents are identified as being in the same domain, further identification of a shared agent and destination agent is initiated.

Enterprise controller 214 can send a test case creation request 308 to the partner controller 212. The test case creation request 308 can include details such as the type of test cases to be created, the cadence at which the test case will be executed, the type of synthetic probes used for the testing, and sending agent details.

Upon receiving the test case creation request, the partner controller 212 performs a sanity check to ensure that the enterprise controller 214 is authorized to use the shared agent(s). If enterprise controller 214 is authorized, partner controller 212 creates relevant test cases for accepting the probe and responds with a confirmation code 310 and a new key. Accordingly, additional identified shared agents are configured to use the key when running their test cases that involve the specific shared agent.

Enterprise controller 214 upon initiating and completion of the test case, can send a test case delete request 312 to the partner controller 212.

Partner controller 212 can send to enterprise controller 214 confirmation 314 that the test case has been deleted in response to the request.

Figure 4:
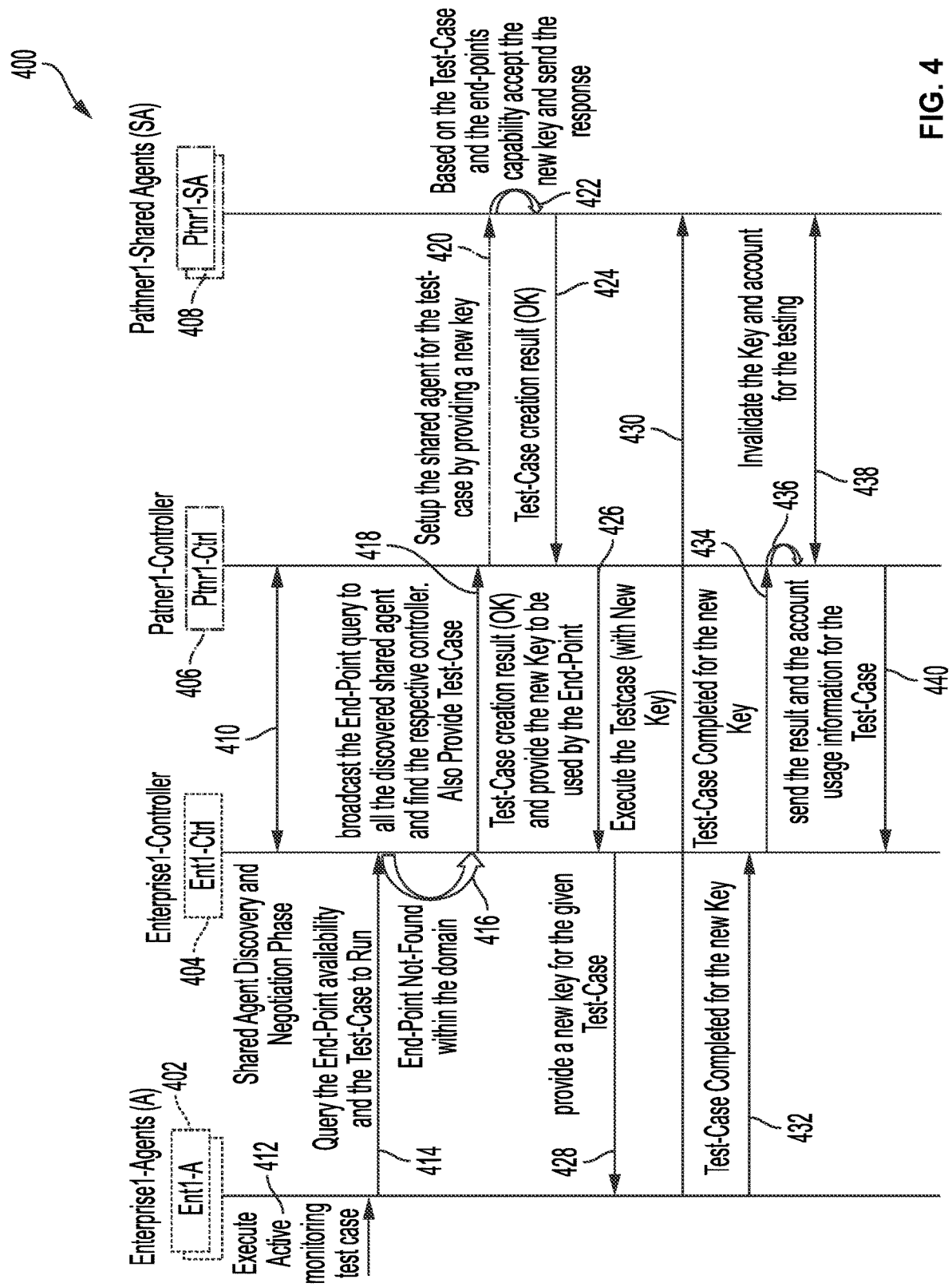
FIG. 4 illustrates an example process to convey the intent of an operator to remote agents, in accordance with some examples of the disclosure.

FIG. 4 illustrates an example process 400 to convey the intent of an operator to remote agents, in accordance with some examples of the disclosure. The following disclosure, outlined in steps 410-440, illustrates communication between enterprise agent 402, enterprise controller 404, partner controller 406, and partner shared agent 408 when performing the shared agent selection.

Enterprise controller 404 and partner controller 406 can initiate communications 410 to negotiate with each other and discover their respective capabilities when determining the availability of a shared agent.

The enterprise agent 402 can perform active monitoring of 412 of test cases followed by executing the test cases monitored.

Enterprise agent 402 can send a notification 414 to enterprise controller 404 of the executed test case and request the 404 to query the end-point availability while the test case is running.

Upon execution of the test case, enterprise controller 404 determines 416 that an endpoint shared with the enterprise controller 404 is not found to be within the domain.

In response to the determination that the endpoint is not in within the domain, enterprise controller 404 can broadcast 418 to the partner controller 406 the end-point query including all discovered shared agents to find a respective controller with which the enterprise controller 404 can execute the test case.

Partner controller 406, which has the administrative control of the partner shared agent 408 endpoint matching the request from the enterprise controller 404, can generate a new key for the received request. Subsequently, the partner controller sends a request 420 to its shared agent—partner shared agent 408—regarding the test-case, cadence, and the newly generated key.

Partner shared agent 408, based on the request, validates the test case and its capability to run the test case and sends a response 422 back to the partner controller 406.

Partner shared agent 408 can send a response 424 to the new key received from partner controller 406. The response 424 can include a test case creation result indicating to partner controller 406 that the test case is successful.

Partner controller 406 can send test creation results 426 to enterprise controller 404 and provide the new key to be used by the endpoint.

In response to receiving the test creation results, enterprise controller 404 can provide 428 the new key for the test case to enterprise agent 402.

Enterprise agent 402 can negotiate directly with partner shared agent 408 and execute 430 the test cases.

Once the test execution is completed enterprise agent 402 sends a message 432 to the enterprise controller 404 about the completion of the test case.

Enterprise controller 404 can then send the test case completion 434 for the key to partner controller 406.

Partner controller 406 following the completion of the test case can invalidate 436 the key, followed by sending a request 438 to partner shared agent 408 to invalidate the key so that any other request with the same key will be invalidated.

Partner shared agent 408 can also send in the request 438 calculated test case usage captured for accounting purposes and sends the information 440 back to partner controller 406.

Partner controller 406 sends the accounting information 440 for the test case that is run for the given key to enterprise controller 404.

Figure 5:
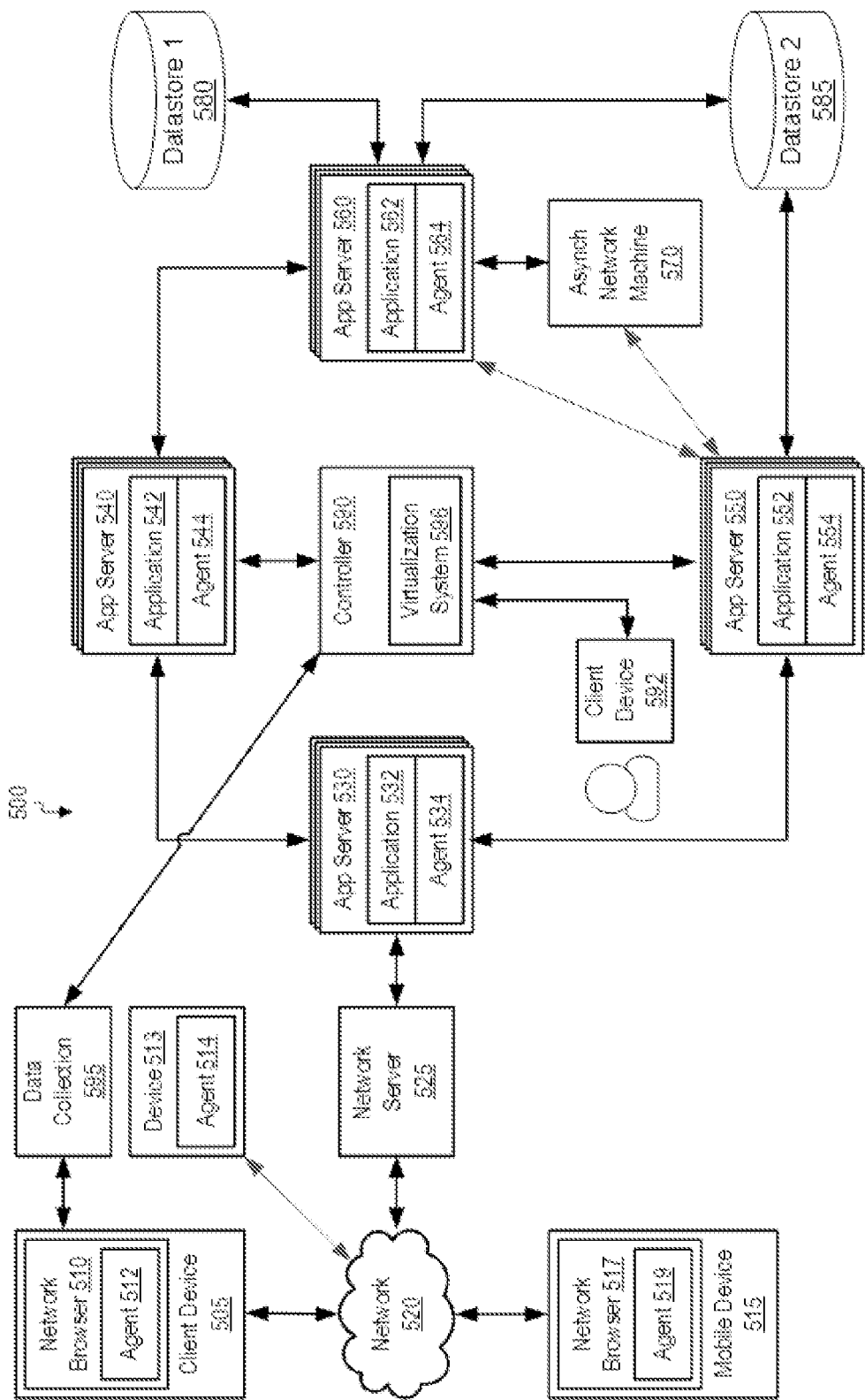
FIG. 5 is a block diagram of an exemplary system for intelligently monitoring a network device as disclosed herein, including the processes disclosed with respect to FIGS. 1-4, in accordance with some examples of the disclosure.

FIG. 5 is a block diagram of an exemplary system 500 for intelligent monitoring of a network device in a monitored environment as disclosed herein, including the processes disclosed with respect to FIGS. 1-4. System 500 in FIG. 5 includes client devices 505 and 592, mobile device 515, network 520, network server 525, application servers 530, 540, 550 and 560, asynchronous network machine 570, data stores 580 and 585, controller 590, and data collection server 595. Controller 590 can include visualization system 596 for displaying the report generated by the Reporters at the browser agents as disclosed herein. In some implementations, the visualization system 596 can be implemented in a separate machine (e.g., a server) different from the one hosting the controller 590.

Client device 505 may include network browser 510 and be implemented as a computing device, such as for example a laptop, desktop, workstation, or some other computing device. Network browser 510 may be a client application for viewing content provided by an application server, such as application server 530 via network server 525 over network 520.

Network browser 510 may include agent 512 to monitor and facilitate the development of a network application. Agent 512 may be installed on network browser 510 and/or client device 505 as a network browser add-on, downloading the application to the server, or in some other manner. Agent 512 may be executed to monitor network browser 510, the operating system of client device 505, and any other application, API, or another component of client device 505. Agent 512 may determine network browser navigation timing metrics, access browser cookies, monitor code, and transmit data to data collection 560, controller 590, or another device. Agent 512 may perform other operations related to monitoring a request or a network at client device 505 as discussed herein including report generating.

Mobile device 515 is connected to network 520 and may be implemented as a portable device suitable for sending and receiving content over a network, such as for example a mobile phone, smart phone, tablet computer, or other portable device. Both client device 505 and mobile device 515 may include hardware and/or software configured to access a web service provided by network server 525.

Mobile device 515 may include network browser 517 and an agent 519. Mobile device may also include client applications and other code that may be monitored by agent 519. Agent 519 may reside in and/or communicate with network browser 517, as well as communicate with other applications, an operating system, APIs and other hardware and software on mobile device 515. Agent 519 may have similar functionality as that described herein for agent 512 on client device 505 and may report data to data collection server 560 and/or controller 590.

Device 513 may be implemented as a network device that communicates with other devices over network 520. Device 513 may be communicatively coupled to network 520 via a wireless network, such as for example a Wi-Fi network. Device 510 may also communicate with devices wirelessly via radio frequency networks, such as for example via a BLUETOOTH communication protocol. Device 510 may include one or more applications and one or more agents 511. Agent 511 may be executed to monitor a device application, operating system, resources such as processor, memory, and power usage, network latency and bandwidth, sensors and inputs, API, or another component of device 513. Agent 512 may monitor code, generate performance data from the monitored code, and transmit data to data collection 560, controller 590, or another device. Agent 512 may perform other operations related to monitoring a request or a network at device 513 as discussed herein including report generating.

Network 520 may facilitate communication of data among different servers, devices, and machines of system 500 (some connections shown with lines to network 520, some not shown). The network may be implemented as a private network, public network, intranet, the Internet, a cellular network, Wi-Fi network, VoIP network, or a combination of one or more of these networks. The network 520 may include one or more machines such as load balance machines and other machines.

Network server 525 is connected to network 520 and may receive and process requests received over network 520. Network server 525 may be implemented as one or more servers implementing a network service and may be implemented on the same machine as application server 530 or one or more separate machines. When network 520 is the Internet, network server 525 may be implemented as a web server.

Application server 530 communicates with network server 525, application servers 540 and 550, and controller 590. Application server 550 may also communicate with other machines and devices (not illustrated in FIG. 5). Application server 530 may host an application or portions of a distributed application. The host application 532 may be in one of many platforms, such as including a Java, PHP, .Net, and Node.JS, be implemented as a Java virtual machine, or include some other host type. Application server 530 may also include one or more agents 534 (i.e., "modules"), including a language agent, machine agent, and network agent, and other software modules. Application server 530 may be implemented as one server or multiple servers as illustrated in FIG. 5.

In some examples, application 532 and other may be instrumented to modify the application or other software. In the event the application 532 is an interpreted language (e.g., Node.JS, Python, etc.), corresponding code can be injected into the source code, or can be modified at various stages, such as transpiling. In other examples, application 532 and other software on application server 530 may be instrumented using byte code insertion, or byte code instrumentation (BCI), to modify the object code of the application or other software. The instrumented object code may include code used to detect calls received by application 532, calls sent by application 532, and communicate with agent 534 during execution of the application. BCI may also be used to monitor one or more sockets of the application and/or application server in order to monitor the socket and capture packets coming over the socket.

In some embodiments, server 530 may include applications and/or code other than a virtual machine. For example, servers 530, 540, 550, and 560 may each include Java code, .Net code, PHP code, Ruby code, C code, C++, or other binary code to implement applications and process requests received from a remote source. References to a virtual machine with respect to an application server are intended to be for exemplary purposes only.

Agents 534 on application server 530 may be installed, downloaded, embedded, or otherwise provided on application server 530. For example, agents 534 may be provided in server 530 by instrumentation of object code, downloading the agents to the server, or in some other manner. Agent 534 may be executed to monitor application server 530, monitor code running in a virtual machine 532 (or other program language, such as a PHP, .Net, or C program), machine resources, network layer data, and communicate with byte instrumented code on application server 530 and one or more applications on application server 530.

Each of agents 534, 544, 554 and 564 may include one or more agents, such as language agents, machine agents, and network agents. A language agent may be a type of agent that is suitable to run on a particular host. Examples of language agents include a JAVA agent, .Net agent, PHP agent, and other agents. The machine agent may collect data from a particular machine on which it is installed. A network agent may capture network information, such as data collected from a socket.

Agent 534 may detect operations such as receiving calls and sending requests by application server 530, resource usage, and incoming packets. Agent 534 may receive data, process the data, for example by aggregating data into metrics, and transmit the data and/or metrics to controller 590. Agent 534 may perform other operations related to monitoring applications and application server 530 as discussed herein. For example, agent 534 may identify other applications, share business transaction data, aggregate detected runtime data, and other operations.

An agent may operate to monitor a node, tier or nodes or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agent may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from a one or more sockets. The network agent may receive flow data from a language agent that is associated with applications to be monitored. For flows in the flow group data that match flow data provided by the language agent, the network agent rolls up the flow data to determine metrics such as TCP throughput, TCP loss, latency, and bandwidth. The network agent may then report the metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the language agent, network agent, and machine agent may report data to the controller. Controller 590 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 534 may create a request identifier for a request received by server 530 (for example, a request received by a client device 505 or 515 associated with a user or another source). The request identifier may be sent to client device 505 or mobile device 515, whichever device sent the request. In embodiments, the request identifier may be created when a data is collected and analyzed for a particular business transaction.

Each of application servers 540, 550 and 560 may include an application and agents. Each application may run on the corresponding application server. Each of applications 542, 552 and 562 on application servers 540-560 may operate similarly to application 532 and perform at least a portion of a distributed business transaction. Agents 544, 554 and 564 may monitor applications 542-562, collect and process data at runtime, and communicate with controller 590. The applications 532, 542, 552 and 562 may communicate with each other as part of performing a distributed transaction. In particular, each application may call any application or method of another virtual machine.

Asynchronous network machine 570 may engage in asynchronous communications with one or more application servers, such as application server 550 and 560. For example, application server 550 may transmit several calls or messages to an asynchronous network machine. Rather than communicate back to application server 550, the asynchronous network machine may process the messages and eventually provide a response, such as a processed message, to application server 560. Because there is no return message from the asynchronous network machine to application server 550, the communications among them are asynchronous.

Data stores 580 and 585 may each be accessed by application servers such as application server 550. Data store 585 may also be accessed by application server 550. Each of data stores 580 and 585 may store data, process data, and return queries received from an application server. Each of data stores 580 and 585 may or may not include an agent.

Controller 590 may control and manage monitoring of business transactions distributed over application servers 530-560. In some embodiments, controller 590 may receive application data, including data associated with monitoring client requests at client device 505 and mobile device 515, from data collection server 560. In some embodiments, controller 590 may receive application monitoring data and network data from each of agents 512, 519, 534, 544 and 554. Controller 590 may associate portions of business transaction data, communicate with agents to configure collection of data, and provide performance data and reporting through an interface. The interface may be viewed as a web-based interface viewable by client 592, which may be a mobile device, client, or any other platform for viewing an interface provided by controller 590. In some embodiments, a client 592 may directly communicate with controller 590 to view an interface for monitoring data.

Client 592 may include any computing device, including a mobile device or a client computer such as a desktop, workstation, or other computing device. Client computer 592 may communicate with controller 590 to create and view a custom interface. In some embodiments, controller 590 provides an interface for creating and viewing the custom interface as a content page, e.g., a web page, which may be provided to and rendered through a network browser application on client 592.

Applications 532, 542, 552 and 562 may be any of several types of applications. Examples of applications that may implement applications 532-562 include a Java, PHP, .Net, Node.JS, and other applications.

Application Intelligence Platform Architecture

Figure 6:
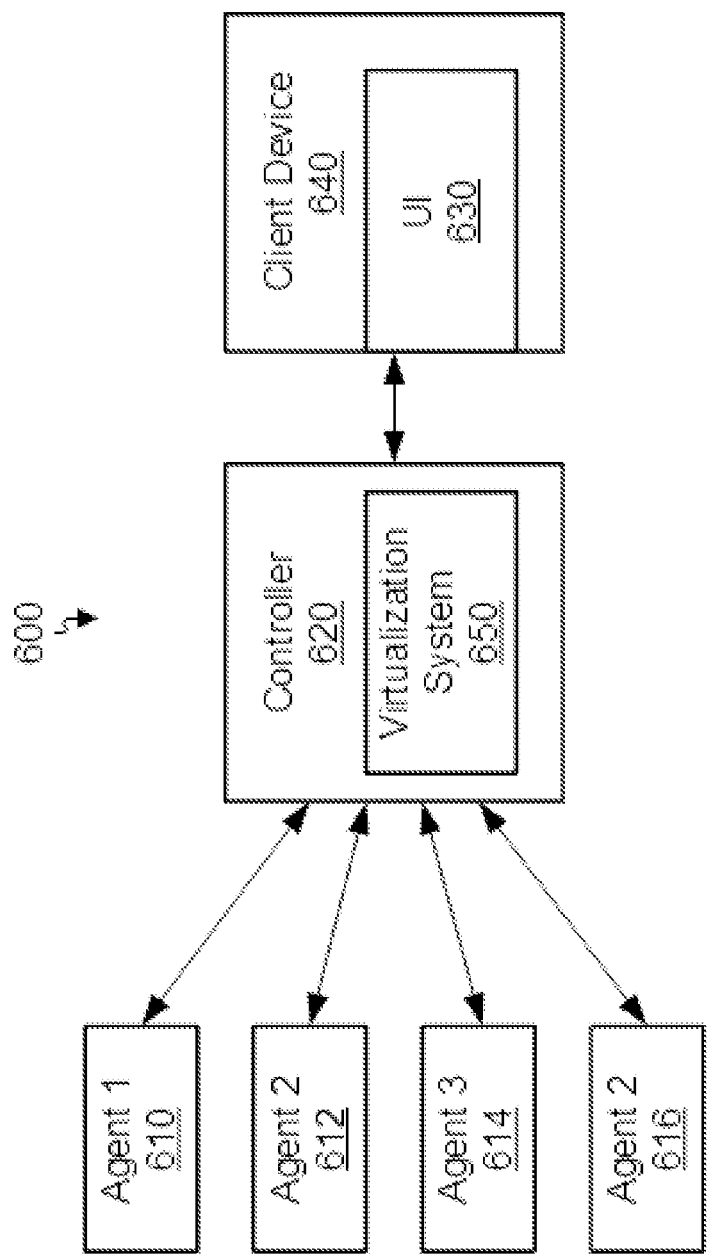
FIG. 6 is a block diagram of an exemplary application intelligence platform that can intelligently monitor a network device as disclosed herein, including the processes disclosed with respect to FIGS. 1-4, in accordance with some examples of the disclosure.

FIG. 6 is a block diagram of an exemplary application intelligence platform 600 that can implement intelligent monitoring of a network device in a monitored environment as disclosed herein. The application intelligence platform is a system that monitors and collect metrics of performance data for an application environment being monitored. At the simplest structure, the application intelligence platform includes one or more agents 610, 612, 614, 616 and one or more controllers 620. While FIG. 6 shows four agents communicatively linked to a single controller, the total number of agents and controller can vary based on a number of factors including the number of applications monitored, how distributed the application environment is, the level of monitoring desired, the level of user experience desired, etc.

Controllers and Agents

The controller 620 is the central processing and administration server for the application intelligence platform. The controller 620 serves a browser-based user interface (UI) 630 that is the primary interface for monitoring, analyzing, and troubleshooting the monitored environment. The controller 620 can control and manage monitoring of business transactions distributed over application servers. Specifically, the controller 620 can receive runtime data from agents 610, 612, 614, 616 and coordinators, associate portions of business transaction data, communicate with agents to configure collection of runtime data, and provide performance data and reporting through the interface 630. The interface 630 may be viewed as a web-based interface viewable by a client device 640. In some implementations, a client device 640 can directly communicate with controller 620 to view an interface for monitoring data.

In the Software as a Service (SaaS) implementation, a controller instance 620 is hosted remotely by a provider of the application intelligence platform 600. In the on-premises (On-Prem) implementation, a controller instance 620 is installed locally and self-administered.

The controllers 620 receive data from different agents 610, 612, 614, 616 deployed to monitor applications, databases and database servers, servers, and end user clients for the monitored environment. Any of the agents 610, 612, 614, 616 can be implemented as different types of agents specific monitoring duties. For example, application agents are installed on each server that hosts applications to be monitored. Instrumenting an agent adds an application agent into the runtime process of the application.

Database agents are software (e.g., Java program) installed on a machine that has network access to the monitored databases and the controller. Database agents queries the databases monitored to collect metrics and passes the metrics for display in the metric browser—database monitoring and in the databases pages of the controller UI. Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents are standalone programs (e.g., standalone Java program) that collect hardware-related performance statistics from the servers in the monitored environment. The standalone machine agents can be deployed on machines that host application servers, database servers, messaging servers, Web servers, etc. A standalone machine agent has an extensible architecture.

End user monitoring (EUM) is performed using browser agents and mobile agents to provide performance information from the point of view of the client, such as a web browser or a mobile native application. Browser agents and mobile agents are unlike other monitoring through application agents, database agents, and standalone machine agents that being on the server. Through EUM, web use (e.g., by real users or synthetic agents), mobile use, or any combination can be monitored depending on the monitoring needs. Browser agents (e.g., agents 610, 612, 614, 616) can include Reporters that report monitored data to the controller.

Browser agents are small files using web-based technologies, such as JavaScript agents injected into each instrumented web page, as close to the top as possible, as the web page is served and collects data. Once the web page has completed loading, the collected data is bundled into a beacon and sent to the EUM cloud for processing and ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent is a small piece of highly performant code that gets added to the source of the mobile application. Mobile RUM provides information on the native iOS or Android mobile application as the end users actually use the mobile application. Mobile RUM provides visibility into the functioning of the mobile application itself and the mobile application's interaction with the network used and any server-side applications the mobile application communicates with.

The controller 620 can include a visualization system 650 for displaying the reports generated by the Reporters at the browser agents as disclosed herein. In some implementations, the visualization system 650 can be implemented in a separate machine (e.g., a server) different from the one hosting the controller 620.

Application Intelligence Monitoring

The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling

Entities in the application environment (such as the JBoss service, MQSeries modules, and databases) and the services provided by the entities (such as a login transaction, service or product search, or purchase transaction) are mapped to an application intelligence model. In the application intelligence model, a business transaction represents a particular service provided by the monitored environment. For example, in an e-commerce application, particular real-world services can include user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions

A business transaction representation of the particular service provided by the monitored environment provides a view on performance data in the context of the various tiers that participate in processing a particular request. A business transaction represents the end-to-end processing path used to fulfill a service request in the monitored environment. Thus, a business environment is a type of user-initiated action in the monitored environment defined by an entry point and a processing path across application servers, databases, and potentially many other infrastructure components. Each instance of a business transaction is an execution of that transaction in response to a particular user request. A business transaction can be created by detecting incoming requests at an entry point and tracking the activity associated with request at the originating tier and across distributed components in the application environment. A flow map can be generated for a business transaction that shows the touch points for the business transaction in the application environment.

Performance monitoring can be oriented by business transaction to focus on the performance of the services in the application environment from the perspective of end users. Performance monitoring based on business transaction can provide information on whether a service is available (e.g., users can log in, check out, or view their data), response times for users, and the cause of problems when the problems occur.

Business Applications

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

Nodes

A node in the application intelligence model corresponds to a monitored server or JVM in the application environment. A node is the smallest unit of the modeled environment. In general, a node corresponds to an individual application server, JVM, or CLR on which a monitoring Agent is installed. Each node identifies itself in the application intelligence model. The Agent installed at the node is configured to specify the name of the node, tier, and business application under which the Agent reports data to the Controller.

Tiers

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flow among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

Backend System

A backend is a component that participates in the processing of a business transaction instance. An agent does not instrument a backend. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

Baselines and Thresholds

The application intelligence platform uses both self-learned baselines and configurable thresholds to help identify application issues. A complex distributed application has a large number of performance metrics, and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of the normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

Health Rules, Policies, and Actions

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, the health rule can define a warning condition as the combination of an average response time greater than the default baseline by 2 standard deviations and a load greater than 500 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, the health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Metrics

Most of the metrics relate to the overall performance of the application or business transaction (e.g., load, average response time, error rate, etc.) or of the application server infrastructure (e.g., percentage CPU busy, percentage of memory used, etc.). The network metrics may include factors such as bandwidth, QoS, latency, delay, throughput, retransmission rate, jitter, utilization, availability, error rate, packet loss, and errors. The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user-defined custom metrics. These custom metrics are base-lined and reported in the controller, just like the built-in metrics.

All metrics can be accessed programmatically using a Representational State Transfer (REST) API that returns either the JavaScript Object Notation (JSON) or the extensible Markup Language (XML) format. Also, the REST API can be used to query and manipulate the application environment.

Snapshots

Snapshots provide a detailed picture of a given application at a certain point in time. Snapshots usually include call graphs that allow that enable drilling down to the line of code that may be causing performance problems. The most common snapshots are transaction snapshots.

Figure 7:
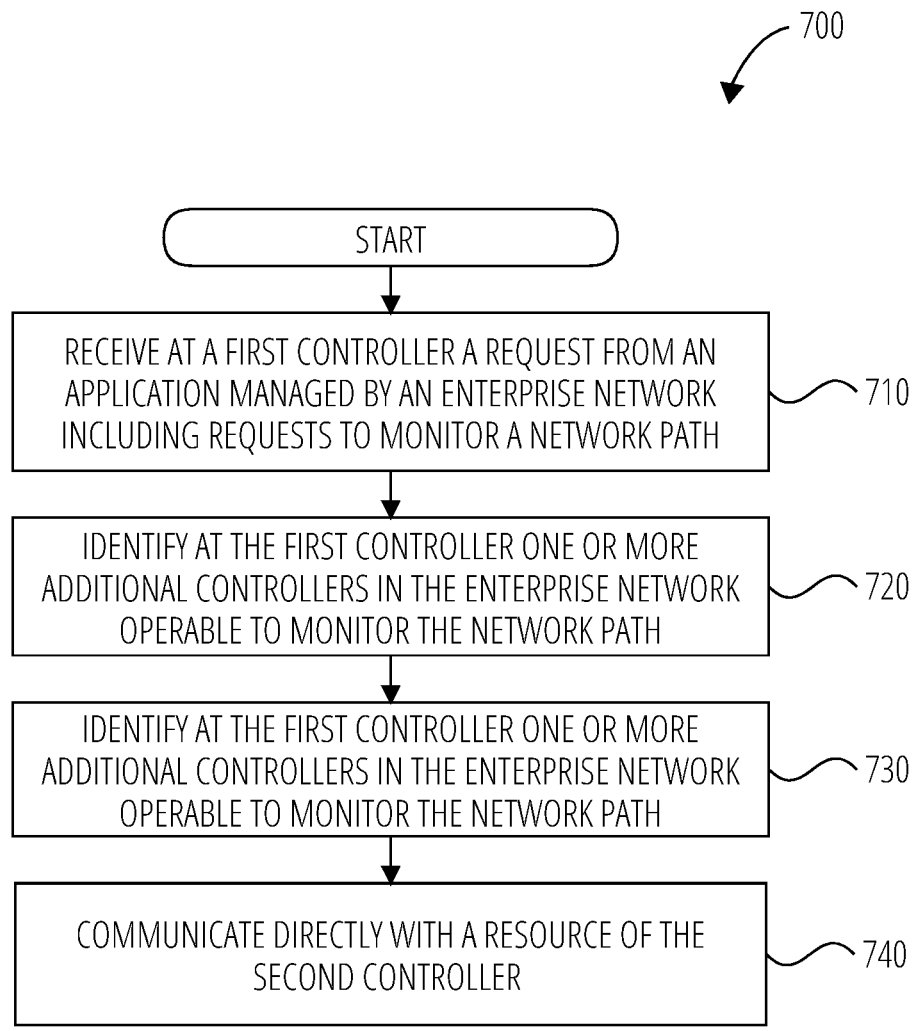
FIG. 7 illustrates an example flow diagram for monitoring application performance in a cross-domain network using multi-controller coordination, in accordance with some examples of the disclosure.

FIG. 7 illustrates an example process 700 for monitoring application performance in a cross-domain network using multi-controller coordination, in accordance with some examples of the disclosure. Although the example process 700 depicts a particular sequence of operations, the sequence may be altered without departing from the scope of the present disclosure. For example, some of the operations depicted may be performed in parallel or in a different sequence that does not materially affect the function of the process 700. In other examples, different components of an example device or system that implements the process 700 may perform functions at substantially the same time or in a specific sequence.

According to some examples, the method includes receiving at a first controller a request from an application managed by an enterprise network including requests to monitor a network path at block 710. For example, the enterprise controller 214 illustrated in FIG. 2 may receive a request from an application, such as App1 116, managed by an enterprise controller 214, including requests to monitor a network path from the partner controller 212. The request information specifies to the enterprise controller 214 a type of action to be performed, a cadence at which the type of action is to be executed, and one or more probes to use during the type of action. The request can further comprise a request for information that includes one or more actions to be performed along the network path by the managed application App1 116.

According to some examples, the method includes identifying at the first controller one or more additional controllers in the enterprise network operable to monitor the network path at block 720. For example, the enterprise controller 214 in identify a source agent and a destination shared agent 306, illustrated in FIG. 3, may identify one or more additional controllers in the enterprise network operable to monitor the network path. The one or more additional controllers can include a first additional controller in a first domain that is in a same domain as the first controller and a second additional controller in a domain that is different from the first domain.

According to some examples, the method includes sending to the second additional controller a token from the first domain including authentication details and one or more monitoring requirements associated with the request at block 730. For example, the enterprise controller 214 illustrated in FIG. 2 may send to the partner controller 212 a token from the first domain including authentication details and one or more monitoring requirements associated with the request.

Further, the method comprises generating an access key related to the resource of the second controller. For example, the partner controller 212 illustrated in FIG. 2 may generate an access key related to the resource of the partner site enterprise agent 106.

Further, the method comprises authenticating the first controller to execute one or more actions to monitor the network path at the resource. For example, the partner controller 212 illustrated in FIG. 2 may authenticate the enterprise controller 214 to execute one or more actions to monitor the network path at the resource.

Further, the method comprises determining based on the request one or more resources associated with the second controller to share with the first controller. For example, the enterprise controller 214 illustrated in FIG. 2 may determine based on the request one or more resources associated with the enterprise controller 214 to share with the partner controller 212.

According to some examples, the method includes communicating directly with a resource of the second controller at block 740. For example, the enterprise controller 214 illustrated in FIG. 2 may communicate directly with the partner site enterprise agent 106 of the partner controller 212. The communication is operable to monitor the request and an associated operation at enterprise controller 214. Enterprise controller 214 can be configured to perform an operation that includes an execution of a set of instructions to probe one or more portions of the network path. In some examples the probe is configured to identify a plurality of network metrics related to performance of the application, App1 116 and App2 118 at the enterprise site agent 108. Additionally, the first controller and the second controller can be configured to share enterprise site agent 108 to perform network monitoring at network paths associated with each of the enterprise controller 214 and the partner controller 212.

Further, the method comprises performing at the second controller a validation procedure to determine one or more capabilities of the resource to perform one or more requirements in the request from the first controller. For example, the partner shared agent 408 illustrated in FIG. 4 may perform a validation procedure to determine one or more capabilities of the resource to perform one or more requirements in the request from the enterprise controller 404.

Figure 8:
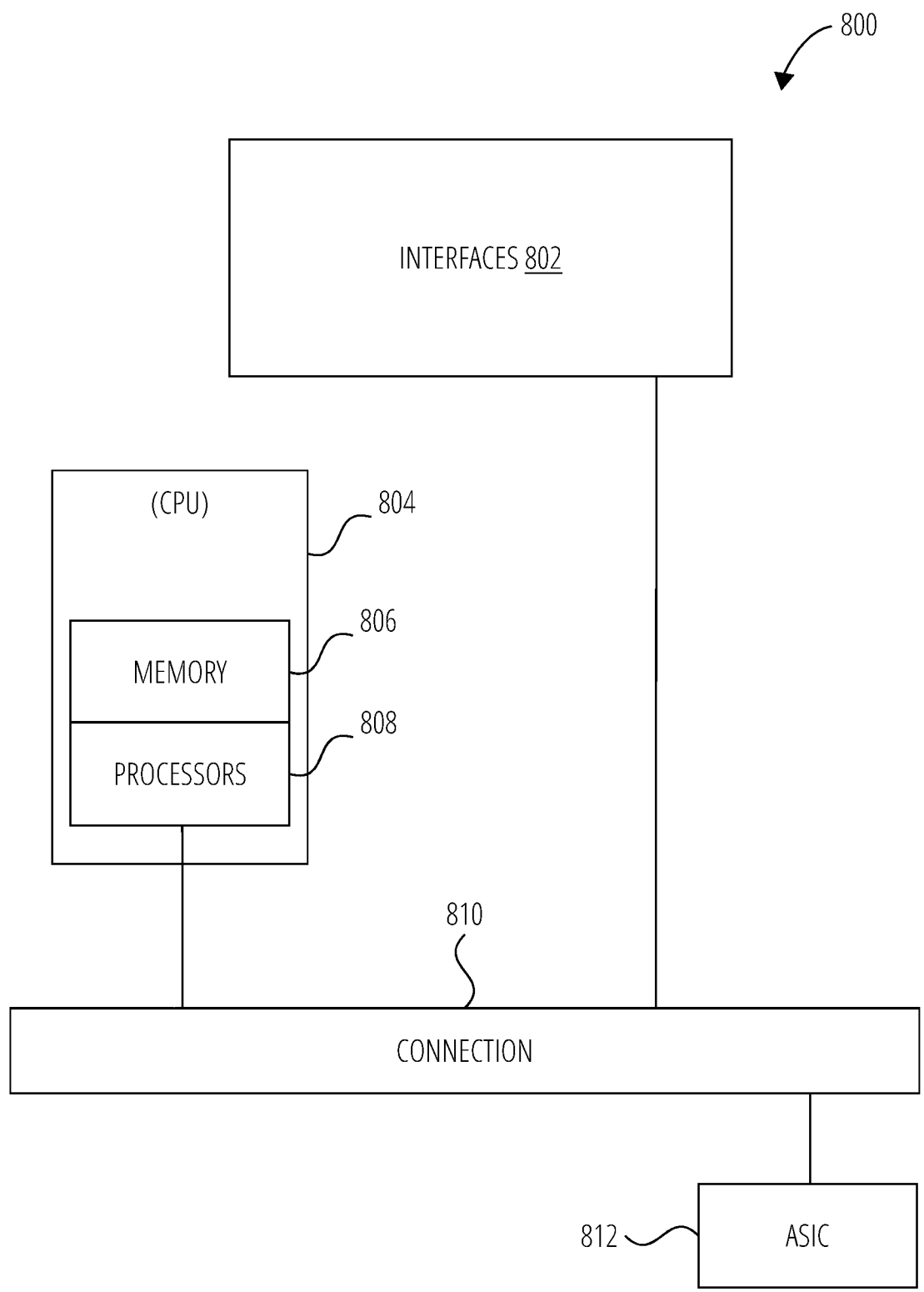
FIG. 8 illustrates an example network device in accordance with some examples of the disclosure, in accordance with some examples of the disclosure.

FIG. 8 illustrates an example network device 800 suitable for performing switching, routing, load balancing, and other networking operations. The example network device 800 can be implemented as switches, routers, nodes, metadata servers, load balancers, client devices, and so forth.

Network device 800 includes a central processing unit (CPU) 804, interfaces 802, and a bus 810 (e.g., a PCI bus). When acting under the control of appropriate software or firmware, the CPU 904 is responsible for executing packet management, error detection, and/or routing functions. The CPU 904 preferably accomplishes all these functions under the control of software including an operating system and any appropriate applications software. CPU 904 may include one or more processors 808, such as a processor from the INTEL X86 family of microprocessors. In some cases, processor 908 can be specially designed hardware for controlling the operations of network device 800. In some cases, a memory 806 (e.g., non-volatile RAM, ROM, etc.) also forms part of CPU 904. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., 904) to efficiently perform routing computations, network diagnostics, security functions, etc.

Although the system shown in FIG. 8 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC), which can be configured to perform routing and/or switching operations. The ASIC can communicate with other components in the network device 800 via the bus 810, to exchange data and signals and coordinate various types of operations by the network device 800, such as routing, switching, and/or data storage operations, for example.

Figure 9:
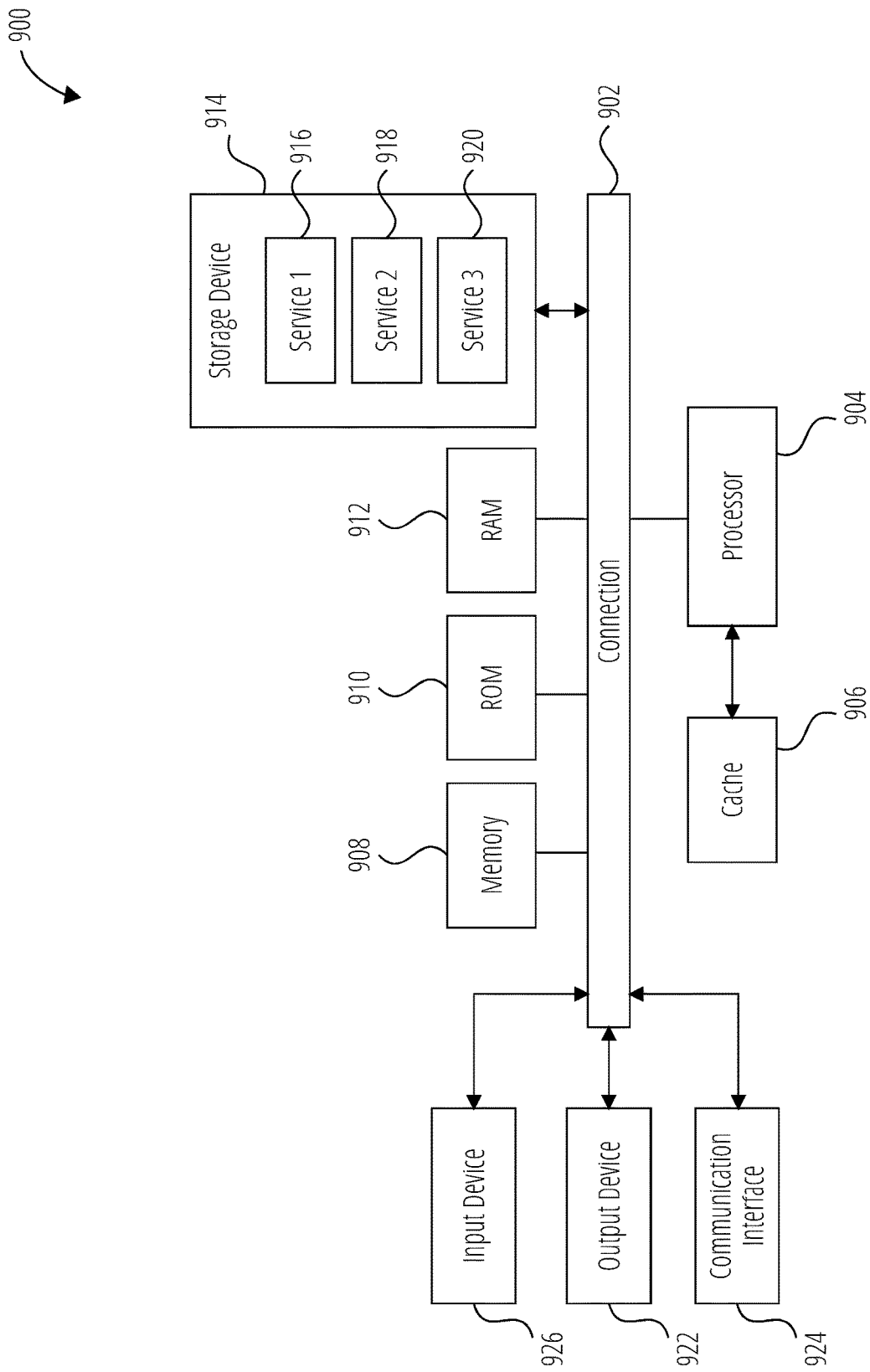
FIG. 9 shows an example of computing system, which can be for example any computing device that can implement components of the system, in accordance with some examples of the disclosure.

FIG. 9 shows an example of computing system 900, which can be, for example, any computing device making up a network device or network application monitoring system of FIGS. 1-6, or any component thereof in which the components of the system are in communication with each other using connection 902. Connection 902 can be a physical connection via a bus, or a direct connection into processor 904, such as in a chipset architecture. Connection 902 can also be a virtual connection, networked connection, or logical connection.

In some embodiments, computing system 900 is a distributed system in which the functions described in the disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 900 includes at least one processing unit (CPU or processor) 904 and connection 902 that couples various system components including system memory 908, such as read-only memory (ROM) 910 and random-access memory (RAM) 912 to processor 904. Computing system 900 can include a cache of high-speed memory 908 connected directly with, in close proximity to, or integrated as part of processor 904.

Processor 904 can include any general-purpose processor and a hardware service or software service, such as services 916, 918, and 920 stored in storage device 914, configured to control processor 904 as well as a special-purpose processor where software instructions are incorporated into the actual processor design. Processor 904 may essentially be a completely self-contained computing system containing multiple cores or processors, a bus, a memory controller, a cache, etc. A multi-core processor may be symmetric or asymmetric.

To enable user interaction, computing system 900 includes an input device 926, which can represent any number of input mechanisms, such as a microphone for speech, a touch-sensitive screen for gesture or graphical input, keyboard, mouse, motion input, speech, etc. Computing system 900 can also include output device 922, which can be one or more of a number of output mechanisms known to those of skill in the art. In some instances, multimodal systems can enable a user to provide multiple types of input/output to communicate with computing system 900. Computing system 900 can include communication interface 924, which can generally govern and manage the user input and system output. There is no restriction on operating on any particular hardware arrangement, and therefore the basic features here may easily be substituted for improved hardware or firmware arrangements as they are developed.

Storage device 914 can be a non-volatile memory device and can be a hard disk or other types of computer-readable media that can store data that are accessible by a computer, such as magnetic cassettes, flash memory cards, solid state memory devices, digital versatile disks, cartridges, random access memories (RAMs), read-only memory (ROM), and/or some combination of these devices.

The storage device 914 can include software services, servers, services, etc., and when the code that defines such software is executed by the processor 904, it causes the system to perform a function. In some embodiments, a hardware service that performs a particular function can include the software component stored in a computer-readable medium in connection with the necessary hardware components, such as processor 904, connection 902, output device 922, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Some aspects of the present technology include:

Aspect 1. A method for monitoring application performance in a cross-domain network using Multi-controller coordination, the method comprising: receiving, at a first controller, a request, from an application managed by an enterprise network including requests to monitor a network path; identifying, at the first controller, one or more additional controllers, in the enterprise network, operable to monitor the network path, wherein the one or more additional controllers includes a first additional controller in a first domain that is in a same domain as the first controller, and a second additional controller in a domain that is different from the first domain; sending to the second additional controller, a token from the first domain including authentication details and one or more monitoring requirements associated with the request; and communicating directly with a resource, of the second controller, operable to monitor the request and associated operation.

Aspect 2. The method of Aspect 1, wherein the request comprises request information that includes one or more actions to be performed along the network path by the managed application.

Aspect 3. The method of any of Aspects 1 to 2, wherein the request information specifies to the second controller a type of action to be performed, a cadence at which the type of action is to be executed, and one or more probes to use during the type of action.

Aspect 4. The method of any of Aspects 1 to 3, wherein the second controller is configured to: generate an access key related to the resource of the second controller, the access key configured to authenticate the first controller to execute one or more actions to monitor the network path at the resource, wherein the one or more actions include monitoring one or more network metrics; and determine based on the request one or more resources associated with the second controller to share with the first controller.

Aspect 5. The method of any of Aspects 1 to 4, wherein the first controller and the second controller are configured to share the resource to perform network monitoring at network paths associated with each of the first and second controller.

Aspect 6. The method of any of Aspects 1 to 5, further comprising: performing, at the second controller, a validation procedure to determine one or more capabilities of the resource to perform one or more requirements in the request from the first controller.

Aspect 7. The method of any of Aspects 1 to 6, wherein the operation includes an execution of a set of instructions to probe one or more portions of the network path, wherein the probe is configured to identify a plurality of network metrics related to performance of the application.

Aspect 8. A network device for monitoring application performance in a cross-domain network using multi-controller coordination includes a transceiver (e.g., a network interface, a wireless transceiver, etc.) and a processor coupled to the transceiver. The processor configured to execute instructions and cause the processor to: receiving, at a first controller, a request, from an application managed by an enterprise network including requests to monitor a network path; identifying, at the first controller, one or more additional controllers, in the enterprise network, operable to monitor the network path, wherein the one or more additional controllers includes a first additional controller in a first domain that is in a same domain as the first controller, and a second additional controller in a domain that is different from the first domain; sending to the second additional controller, a token from the first domain including authentication details and one or more monitoring requirements associated with the request; and communicating directly with a resource, of the second controller, operable to monitor the request and an associated operation.

Aspect 9. The network device of Aspect 8, wherein the request comprises request information that includes one or more actions to be performed along the network path by the managed application.

Aspect 10. The network device of any of Aspects 8 to 9, wherein the request information specifies to the second controller a type of action to be performed, a cadence at which the type of action is to be executed, and one or more probes to use during the type of action.

Aspect 11. The network device of any of Aspects 8 to 10, wherein the processor is configured to execute the instructions and cause the processor to: generate an access key related to the resource of the second controller, authenticate the first controller to execute one or more actions to monitor the network path at the resource, wherein the one or more actions include monitoring one or more network metrics; and determine based on the request one or more resources associated with the second controller to share with the first controller.

Aspect 12. The network device of any of Aspects 8 to 11, wherein the first controller and the second controller are configured to share the resource to perform network monitoring at network paths associated with each of the first and second controller.

Aspect 13. The network device of any of Aspects 8 to 12, wherein the second controller is configured to perform a validation procedure to determine one or more capabilities of the resource to perform one or more requirements in the request from the first controller.

Aspect 14. The network device of any of Aspects 8 to 13, wherein the operation includes an execution of a set of instructions to probe one or more portions of the network path, wherein the probe is configured to identify a plurality of network metrics related to performance of the application.

Aspect 15. A computer-readable medium comprising instructions using a computer system. The computer includes a memory (e.g., implemented in circuitry) and a processor (or multiple processors) coupled to the memory. The processor (or processors) is configured to execute the computer-readable medium and cause the processor to: receiving, at a first controller, a request, from an application managed by an enterprise network including requests to monitor a network path; identifying, at the first controller, one or more additional controllers, in the enterprise network, operable to monitor the network path, wherein the one or more additional controllers includes a first additional controller in a first domain that is in a same domain as the first controller, and a second additional controller in a domain that is different from the first domain; sending to the second additional controller, a token from the first domain including authentication details and one or more monitoring requirements associated with the request; and communicating directly with a resource, of the second controller, operable to monitor the request and an associated operation.

Aspect 16. The computer-readable medium of Aspect 15, wherein the request comprises request information that includes one or more actions to be performed along the network path by the managed application.

Aspect 17. The computer-readable medium of any of Aspects 15 to 16, wherein the request information specifies to the second controller a type of action to be performed, a cadence at which the type of action is to be executed, and one or more probes to use during the type of action.

Aspect 18. The computer-readable medium of any of Aspects 15 to 17, wherein the processor is configured to execute the computer-readable medium and cause the processor to: generate an access key related to the resource of the second controller, authenticate the first controller to execute one or more actions to monitor the network path at the resource, wherein the one or more actions include monitoring one or more network metrics; and determine based on the request one or more resources associated with the second controller to share with the first controller.

Aspect 19. The computer-readable medium of any of Aspects 15 to 18, wherein the first controller and the second controller are configured to share the resource to perform network monitoring at network paths associated with each of the first and second controller.

Aspect 20. The computer-readable medium of any of Aspects 15 to 19, wherein the processor is configured to execute the computer-readable medium and cause the processor to: performing, at the second controller, a validation procedure to determine one or more capabilities of the resource to perform one or more requirements in the request from the first controller.

Aspect 21. The computer-readable medium of any of Aspects 15 to 20, wherein the operation includes an execution of a set of instructions to probe one or more portions of the network path, wherein the probe is configured to identify a plurality of network metrics related to performance of the application.

What is claimed is:
1. A method for monitoring application performance in a cross-domain network using multi-controller coordination, the method comprising:

receiving, at a first controller, a request, from an application managed by an enterprise network including requests to monitor a network path;

identifying, at the first controller, one or more additional controllers, in the enterprise network, operable to monitor the network path, wherein the one or more additional controllers includes a first additional controller in a first domain that is in a same domain as the first controller, and a second additional controller in a domain that is different from the first domain;

sending to the second additional controller, a token from the first domain including authentication details and one or more monitoring requirements associated with the request;

authenticating the first controller via an access key related to a resource of the second additional controller to execute one or more actions to monitor the network path at the resource; and communicating directly with a resource, of the second additional controller, operable to monitor the request and the one or more actions.

2. The method of claim 1, wherein the request comprises request information that includes the one or more actions to be performed along the network path by the managed application.

3. The method of claim 2, wherein the request information specifies to the second additional controller a type of action to be performed, a cadence at which the type of action is to be executed, and one or more probes to use during the type of action.

4. The method of claim 1, wherein the one or more actions include monitoring one or more network metrics.

5. The method of claim 1, wherein the first controller and the second additional controller are configured to share the resource to perform network monitoring at network paths associated with each of the first and second additional controller.

6. The method of claim 1, further comprising:
performing, at the second additional controller, a validation procedure to determine one or more capabilities of the resource to perform one or more requirements in the request from the first controller.

7. The method of claim 1, wherein the one or more actions includes an execution of a set of instructions to probe one or more portions of the network path, wherein the probe is configured to identify a plurality of network metrics related to performance of the application.

8. A network device for monitoring application performance in a cross-domain network using multi-controller coordination, comprising:
a transceiver;
a processor, coupled to the transceiver and configured to execute instructions and cause the processor to:
receiving a request, from an application managed by an enterprise network including requests to monitor a network path;
identifying one or more additional controllers, in the enterprise network, operable to monitor the network path, wherein the one or more additional controllers includes a first additional controller in a first domain that is in a same domain, and a second additional controller in a domain that is different from the first domain;
sending to the second additional controller, a token from the first domain including authentication details and one or more monitoring requirements associated with the request;
authenticating the first controller via an access key related to a resource of the second additional controller to execute one or more actions to monitor the network path at the resource; and
communicating directly with a resource, of the second additional controller, operable to monitor the request and the one or more actions.

9. The network device of claim 8, wherein the request comprises request information that includes the one or more actions to be performed along the network path by the managed application.

10. The network device of claim 9, wherein the request information specifies to the second additional controller a type of action to be performed, a cadence at which the type of action is to be executed, and one or more probes to use during the type of action.

11. The network device of claim 8, wherein the one or more actions include monitoring one or more network metrics.

12. The network device of claim 8, wherein the first controller and the second additional controller are configured to:
share the resource to perform network monitoring at network paths associated with each of the first controller and second additional controller.

13. The network device of claim 8, wherein the second additional controller is configured to:
instruct the second additional controller to perform a validation procedure to determine one or more capabilities of the resource to perform one or more requirements in the request from the first controller.

14. The network device of claim 8, wherein the one or more actions includes an execution of a set of instructions to probe one or more portions of the network path, wherein the probe is configured to identify a plurality of network metrics related to performance of the application.

15. A non-transitory computer-readable medium comprising instructions, the instructions, when executed by a computing system including a processor and a memory, cause the computing system to:
receive, at a first controller, a request, from an application managed by an enterprise network including requests to monitor a network path;
identify, at the first controller, one or more additional controllers, in the enterprise network, operable to monitor the network path, wherein the one or more additional controllers includes a first additional controller in a first domain that is in a same domain as the first controller, and a second additional controller in a domain that is different from the first domain;
send to the second additional controller, a token from the first domain including authentication details and one or more monitoring requirements associated with the request;
authenticating the first controller via an access key related to a resource of the second additional controller to execute one or more actions to monitor the network path at the resource; and
communicate directly with a resource, of the second additional controller, operable to monitor the request and the one or more actions.

16. The computer-readable medium of claim 15, wherein the request comprises request information that includes the one or more actions to be performed along the network path by the managed application.

17. The computer-readable medium of claim 16, wherein the request information specifies to the second additional controller a type of action to be performed, a cadence at which the type of action is to be executed, and one or more probes to use during the type of action.

18. The computer-readable medium of claim 15, wherein the one or more actions include monitoring one or more network metrics.

19. The computer-readable medium of claim 15, wherein the first controller and the second additional controller are configured to:
    share the resource to perform network monitoring at network paths associated with each of the first and second additional controller.

20. The computer-readable medium of claim 15, wherein the computer-readable medium further comprises instructions that, when executed by the computing system, cause the computing system to:
    perform, at the second additional controller, a validation procedure to determine one or more capabilities of the resource to perform one or more requirements in the request from the first controller.

* * * * *